US006275580B1

(12) United States Patent
Faraci et al.

(10) Patent No.: US 6,275,580 B1
(45) Date of Patent: Aug. 14, 2001

(54) TELECONFERENCING DEVICE HAVING ACOUSTIC TRANSDUCERS POSITIONED TO IMPROVE ACOUSTIC ECHO RETURN LOSS

(75) Inventors: Philip Faraci, Purcelleville; Philip Lang, Reston, both of VA (US)

(73) Assignee: Tellabs Operations, Inc., Lisle, IL (US)

(*) Notice: Subject to any disclaimer, the term of this patent is extended or adjusted under 35 U.S.C. 154(b) by 0 days.

(21) Appl. No.: 09/111,441

(22) Filed: Jul. 7, 1998

(51) Int. Cl.[7] .............................. H04M 9/08; H04R 3/00
(52) U.S. Cl. ............................ 379/388; 379/202; 381/92
(58) Field of Search .................................... 379/387–392, 379/202, 420, 110.01; 381/92, 345, 71.1

(56) References Cited

U.S. PATENT DOCUMENTS 3,889,058 6/1975 Gabr .
4,346,261 8/1982 Hestad et al. .
5,787,183 * 7/1998 Chu et al. .............................. 381/92
5,808,663 * 9/1998 Okaya ............................ 379/110.01

* cited by examiner

*Primary Examiner*—Wing F. Chan
(74) *Attorney, Agent, or Firm*—John B. Berryhill; Dann Dorfman Herrell & Skillman

(57) ABSTRACT

A teleconferencing terminal for hands-free full duplex audio telecommunication systems is provided which limits the amount of acoustic coupling between the terminal's microphone and loudspeaker. A directional microphone is positioned equidistantly from two loudspeakers such that audio signals emanating from the loudspeakers are acoustically coupled by the microphone at substantially equivalent audio levels. The terminal loudspeakers are impedance matched and connected in phase opposition with respect to each other so that signals emanating from the loudspeakers in the vicinity of the microphone are destructively canceled.

12 Claims, 4 Drawing Sheets

TELECONFERENCING DEVICE HAVING ACOUSTIC TRANSDUCERS POSITIONED TO IMPROVE ACOUSTIC ECHO RETURN LOSS

FIELD OF THE INVENTION

This invention relates to full duplex telecommunication systems. More particularly, the present invention relates to a teleconferencing device having an acoustic configuration employing destructive cancellation of loudspeaker signals in the vicinity of an audio detection transducer to improve the acoustic echo return loss (AERL) of the device.

BACKGROUND OF THE INVENTION

Whether incorporated in video conferencing systems or standard speakerphones, the ability to communicate high quality Near-End signals while simultaneously receiving Far-End signals (i.e. full duplex communication) has proven to be a basic requirement of telecommunication systems.

An undesirable phenomenon inherent in full duplex, "hands-free", teleconferencing systems is that of signal echo caused by the acoustic coupling between a communication terminal's transducers. The echo in audio conferencing results from the re-transmission of a Far-End signal by the Near-End terminal of a communication system.

In speakerphones, the echo is caused by reflected Far-End voice transmissions which are coupled to the Near-End communication terminal's microphone section via the Near-End terminal's loudspeaker. Echo occurs with such audio conferencing systems because of the close physical proximity of the loudspeaker and microphone elements. The change in level of the echo as it is coupled from the Near-End's loudspeaker to the microphone is known as the Acoustic Echo Return Loss (AERL).

In order to reduce echo signals present in full-duplex conversation, several signal processing alternatives have been developed. Those alternatives include analog voice switching, echo suppression, and digital adaptive echo cancellation techniques.

High quality communication terminals often employ digital signal processing such as adaptive echo cancellation circuitry which predicts and synthesizes an expected feedback signal, and then subtracts the expected feedback signal from the Near-End microphone signal. Although adaptive echo cancellation provides significant reduction in echo signal levels, it does not eliminate echo signals. Moreover, such elaborate and often costly techniques are not economically feasible for all applications.

Even in applications utilizing echo cancellation circuitry, the performance of the adaptive echo cancellation circuitry is often affected by the strong coupling between the loudspeaker(s) and microphone. The coupling dominates the control process within the internal adaptive filter used by these communication devices, reducing the performance by limiting the maximum loudspeaker and microphone levels in order to reduce the acoustic echo to acceptable levels. Often times, users of such devices attempt to compensate this condition by increasing the volume beyond a limit which causes the device's software to revert to a "semi full-duplex" or half-duplex mode.

Therefore, it would be desirable to further reduce AERL prior to the electronic processing of the Near-End signal by a communication terminal to decrease the reliance on complex signal processing circuitry. In addition, it is also desired to reduce the level of feedback available to a communication device employing echo cancellation circuitry to offset limitations in the dynamic range of the adaptive filters of the circuitry.

SUMMARY OF THE INVENTION

In accordance with the present invention, a teleconferencing apparatus for electronic communication is provided. In one embodiment, the teleconferencing apparatus includes at least two loudspeakers and a uni-directional microphone all disposed in a single housing.

The loudspeakers are mounted in the housing along a placement axis with their mouths facing outwardly thereof. The loudspeakers have central axes directed away from the housing surface and from the unidirectional microphone. The loudspeakers are "matched" (i.e., they have essentially equal impedance characteristics) and are connected in phase opposition across the near-end output path of the teleconferencing apparatus. The angular positioning of the loudspeakers results in an overlap of their sound intensity dispersion patterns in the vicinity of the microphone's axis of maximum sensitivity. The overlap portion of each individual phase opposing loudspeaker intensity pattern being essentially identical with respect to the other such that equal but opposite signal transmissions result in destructive cancellation in the overlap region.

The uni-directional microphone is mounted in the housing with its sound-responsive element facing outwardly thereof. The uni-directional microphone is disposed symmetrically relative to the placement of the loudspeakers such that the microphone's axis of maximum sensitivity is positioned in a region where the destructive cancellation of sounds emanating from the loudspeakers occurs. By virtue of the aforesaid arrangement, acoustic coupling between the loudspeaker and the microphones is substantially reduced.

BRIEF DESCRIPTION OF THE DRAWINGS

Other benefits and advantages of the present invention will become apparent to those skilled in the art upon reading and understanding the following detailed specification and related drawings, wherein.

DETAILED DESCRIPTION OF THE PREFERRED EMBODIMENT

Microphones can be broadly categorized as omni-directional or directional. Omni-directional microphones are substantially equally sensitive to sound waves arriving at the microphone from any direction. Directional microphones exhibit a greater degree of sensitivity to sounds arriving from certain directions than to sounds arriving from other directions. Bi-directional microphones, for example, are characterized by maximum sensitivity in two directions, usually separated by about 180°. Uni-directional microphones are characterized by maximum sensitivity in a single direction.

One type of uni-directional microphone is a cardioid microphone, wherein the sensitivity pattern resembles a cardioid, or "heart shape", which has at least one direction of minimum sensitivity. The direction of minimum sensitivity of a cardioid microphone often referred to as the "shadow" of the microphone, is ordinarily at an angle of 180° from the direction of maximum sensitivity.

Cardioid microphones include super-cardioids and hyper-cardioids, which may have two minima separated by angles of ±120° to ±140° from the direction of maximum sensitivity. The actual response pattern that is obtained in a practical setting also depends upon the acoustic environment of the microphone.

It is noted that the term "sensitivity" is often defined in the acoustic arts as the inverse proportion of the electrical response produced by a microphone relative to an incident sound pressure level. For clarity of explanation, the term "sensitivity" is used herein to refer to the proportionate electrical response relative to the pressure of the incident sound wave. Hence, as used herein, the term "greater sensitivity" refers to a larger electrical response for a given sound pressure level, relative to a reference sensitivity level.

The term loudspeaker is used herein to refer to loudspeaking transducers, loudspeaker is not used to differentiate a transducer of a particular power rating, but to avoid usage of the term "speaker." In telecommunications technology "speaker" is often confused with a "person who is talking" (who are usually called talkers for this purpose).

Figure 1:
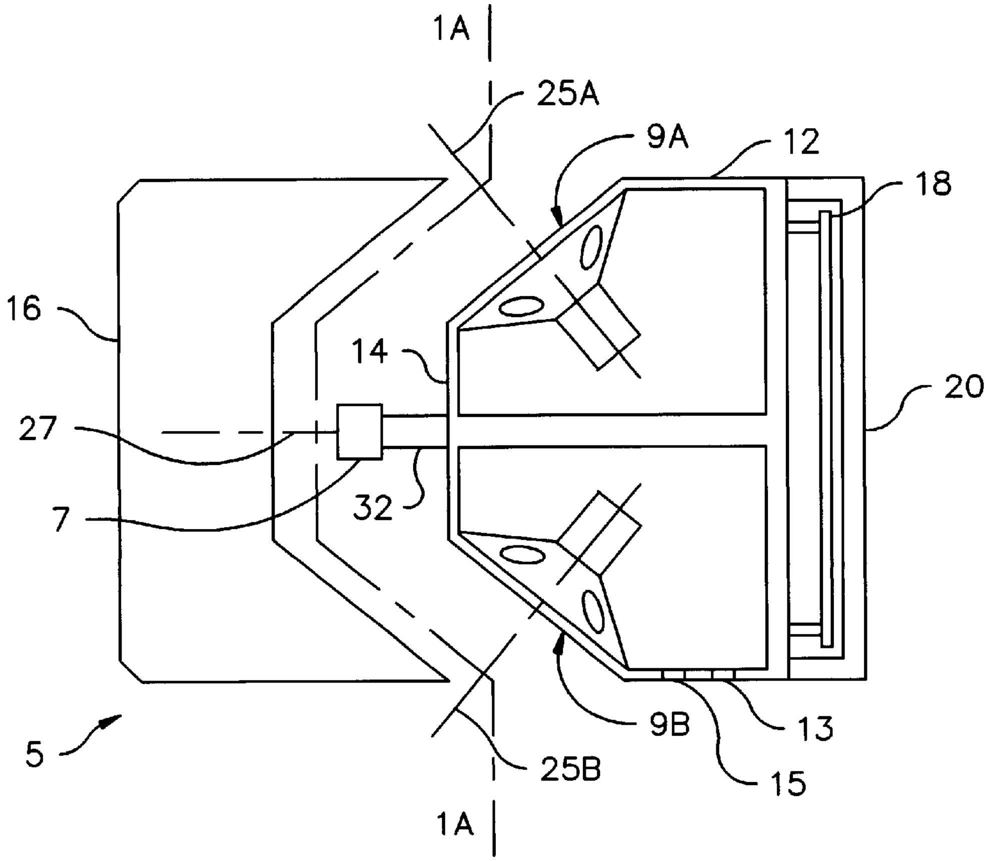
FIG. 1 is an exploded section elevation view of a teleconferencing device according to one embodiment of the present invention.
Figure 1A:
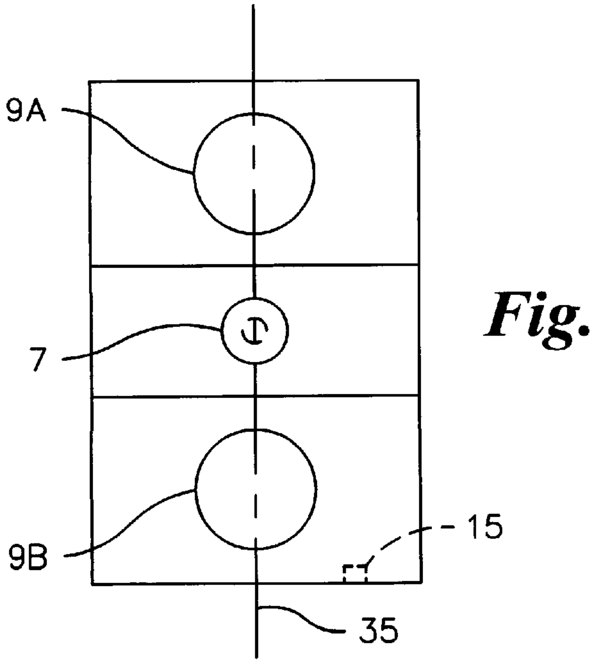
FIG. 1A is a front elevation view of the teleconferencing device of FIG. 1 as viewed along line 1A—1A.

Referring now to FIGS. 1–1A, there is shown a teleconferencing terminal 5 in accordance with the present invention. The teleconferencing terminal 5 includes a pair of matched loudspeakers 9A and 9B connected in phase opposition, a unidirectional microphone 7, a power terminal 13, a communication terminal 15, and a communications circuit 18. Cover 16 is easily removable for access to microphone 7 and loudspeakers 9A and 9B, the cover serving to protect the fragile sound responsive elements of the acoustic devices from accidental damage or puncture.

Those components are all contained in a housing 12 having a front surface 14, a back cover 20, and a front cover 16. A communication terminal 15 and power terminal 13 are conveniently disposed on a sidewall of housing 12 or can be disposed on the back cover thereof. Suitable terminals for such a configuration are well known. Communications terminal 15 is preferably embodied as an RJ11U telephone jack for connecting the terminal with the communication interface circuitry of a personal computer or workstation. The power terminal 13 is preferably embodied as a DC power jack for connecting the teleconferencing terminal 5 to a source of electrical power.

Communication circuit 18 includes amplification means for boosting the level of far-end and near-end transmissions. Additionally, the communications circuit 18 includes echo cancellation circuitry for reducing the acoustic echo.

Figure 2:
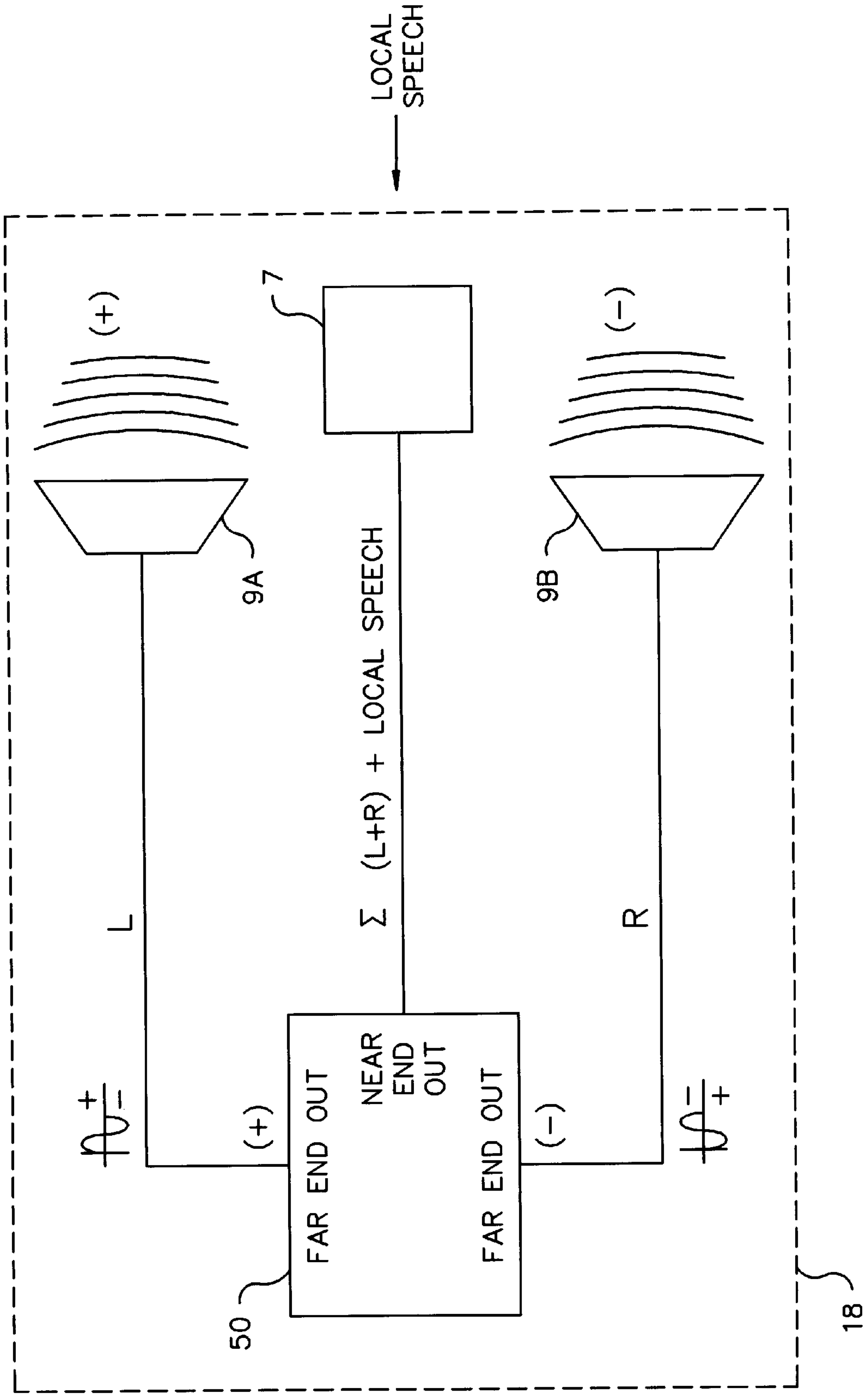
FIG. 2 is a functional block diagram of the communications circuit of the teleconferencing device of FIG. 1.

Referring now to FIG. 2, the two loudspeakers 9A, 9B have essentially the same, preferably identical, sound propagation patterns and impedance characteristics (i.e., they are matched). The loudspeakers 9A and 9B are mounted behind the front surface 14 of housing 12 and connected in phase opposition with respect to the near-end output interface 50 of communications circuit 18. In this way, upon proper positioning of loudspeakers 9A and 9B, phase opposing signals will be equally coupled in the vicinity of the microphone 7.

Referring again to FIGS. 1–1A, the orientation of loudspeakers 9A and 9B is such that the mouths of the loudspeakers face outwardly from the front surface 14. Loudspeakers 9A and 9B have central axes 25A and 25B respectively, which define the direction of sound propagation for each loudspeaker. As shown in FIG. 1A, loudspeakers 9A and 9B and microphone 7 are aligned along a common axis 35, such that the axes 25A, 25B and 27 are aligned in a common plane.

The uni-directional microphone 7 is disposed in the central portion of front surface 14 and supported by the microphone stalk 32 extending away from surface 14. The microphone 7 is a uni-directional microphone, preferably a cardioid microphone.

The orientation of microphone 7 is such that the sound responsive element of microphone 7 is equally sensitive to corresponding portions of the equal phase opposing sound intensity dispersion patterns of loudspeakers 9A and 9B. A microphone axis 27 defines the center of microphone 7. Thus, microphone 7 is oriented such that corresponding portions of the sound intensity dispersion patterns of loudspeakers 9A and 9B are symmetrical with respect to the microphone axis 27. The portions of the sound intensity dispersion patterns have substantially identical but phase opposing amplitudes. The microphone 7 functions as a summing junction acting to cancel these symmetrical sound intensity dispersion pattern portions.

In the embodiment shown, the microphone 7 is also aligned along loudspeaker axis 35, however such alignment is not necessary to practice the invention. The microphone 7 extends forward of housing front surface 14 such that the microphone 7 is everywhere equidistant from the mouths of loudspeakers 9A and 9B. Microphone 7 has a microphone axis 27 and the direction of maximum sensitivity of the microphone is centered along microphone axis 27. Microphone 7 is preferably positioned forward of the front surface 14 such that it is within a region common to the sound intensity dispersion patterns of both loudspeakers. In an alternative embodiment, the microphone 7 can be mounted directly to the front surface 14 without a stalk when the common region of the intensity loudspeaker region is configured in close proximity to front surface 14.

In the embodiment shown in FIG. 1, loudspeakers 9A and 9B have their central axes, 25A and 25B respectively, directed away from microphone axis 27 at an angle of about 35°. It is desirable to have the central axes 25A and 25B directed away from the microphone axis 27 as a preferred way to reduce the intensity of the acoustic energy in the vicinity of microphone 7. However, alternative configurations including parallel arrangement of central axes 25A and 25B is within the scope of the invention. In all embodiments, the central axes of the loudspeakers 9A and 9B are oriented to symmetrically place congruent phase opposing portions of their respective intensity patterns such that the portions envelope the microphone axis 27. In the preferred embodiment, the symmetrically placed phase portions overlap in defined areas, destructively cancelling loudspeaker signals in the vicinity of microphone 7.

Figure 3:
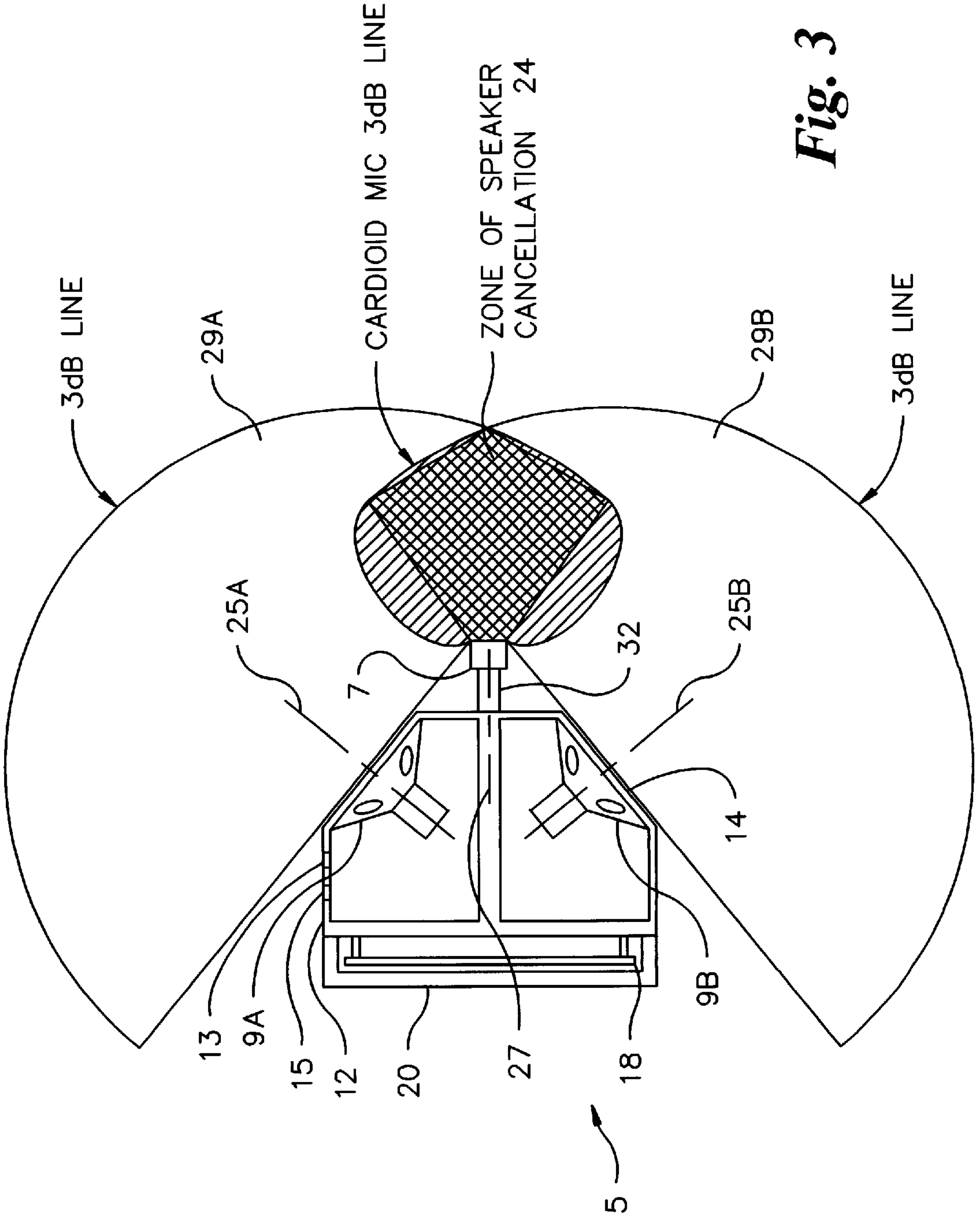
FIG. 3 is a side view of the teleconferencing device of FIG. 1 showing the sound intensity dispersion patterns of the loudspeakers.

Referring now to FIG. 3 the acoustic environment of the oriented transducers of the device 5 is shown. The loudspeakers 9A and 9B have sound intensity dispersion patterns 29A and 29B, respectively. The outer limits of these patterns are defined by the 3 dB line (i.e., half power limit). In areas outside the 3 dB line the sound intensity dispersion decreases exponentially (roll-off) as the distance from the 3 dB line is increased. As such, areas outside the 3 dB line of a transducers range (i.e., loudspeakers and microphone) are not significant relative to the efficacy of the acoustic arrangement described herein.

The sound intensity dispersion patterns 29A and 29B partially overlap to form a zone of loudspeaker cancellation 24. The cancellation zone 24 results from the phase opposing nature of the acoustic signals in the overlap area of the sound intensity dispersion patterns 29A and 29B of loudspeakers 9A and 9B. The size of the zone 24 depends upon the spacing between loudspeakers 9A and 9B from microphone 7 along placement axis 35. In the overlap zone 24 sounds emanating from the loudspeakers 9A and 9B are subject to destructive cancellation. Microphone 7 has its sound responsive element positioned within cancellation zone 24 and has its center axis 27 positioned to bisect the zone of cancellation 24. In this way, the zone of loudspeaker cancellation is centered about microphone axis 27, the axis coinciding with the location of the maximum sound sensitivity of microphone 7. The requirement for and/or length of microphone stalk 32 depends upon the proximity of zone 24 to surface 14, which is in turn dependent upon the spacing of loudspeakers 9A and 9B along placement axis 35. The result of this arrangement is that acoustic coupling between the loudspeaker 9A and uni-directional microphone 7 is essentially canceled because of the phase opposing acoustic energy generated by loudspeaker 9B. Similarly acoustic coupling between the loudspeaker 9B and uni-directional microphone 7 is essentially canceled because of the phase opposing acoustic energy generated by loudspeaker 9A. Therefore, sounds emanating from loudspeakers 9A and 9B are destructively canceled in the region of the microphones maximum sensitivity.

Thus, as FIG. 3 illustrates, sounds which are not applied to the microphone 7 at even, phase opposing levels with respect to one another will result in an output signal from the microphone 7 through communication circuit 18. Multipath arrival of loudspeaker signals caused by room acoustics will be negligible due to the limited sensitivity of the microphone to sounds emanating from outside cancellation zone 24 and beyond the microphone 3 dB line. Additionally, the teleconferencing device 5 is preferably positioned away from reflective surfaces in the immediate vicinity thereof. For example, AERL levels in communication such as that from a two-way telephone conversation are reduced due to the cancellation zone created between the microphone's sound responsive element and the microphone's 3 DB line. The echo from loudspeakers 9A and 9B caused by far-end speech is destructively canceled in zone 24.

Figure 4:
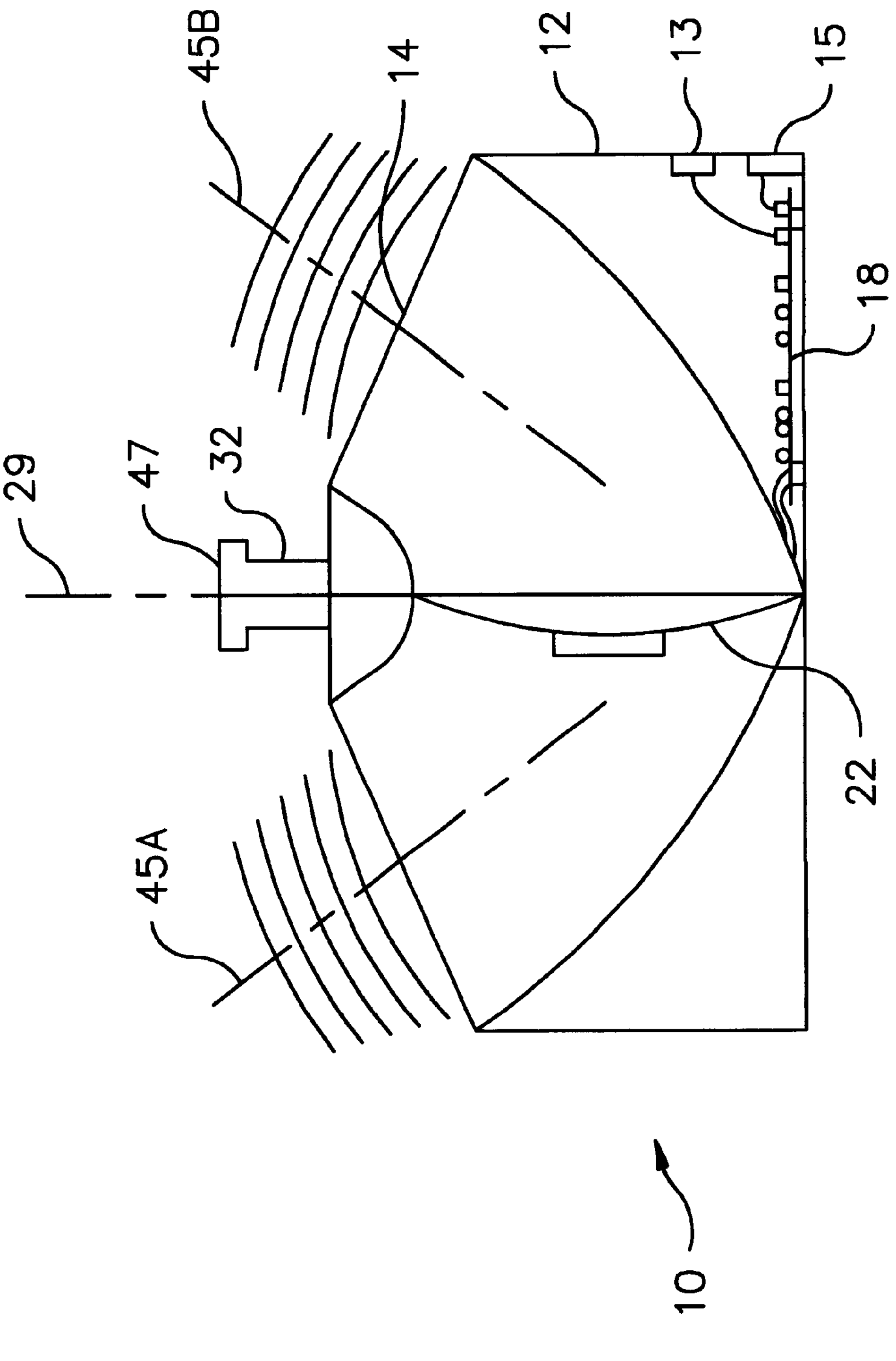
FIG. 4 is a schematic view of an alternative embodiment of the present invention using a single loudspeaker.

Referring now to FIG. 4, an alternative embodiment of a teleconferencing unit 10 according to this invention is shown. The sound is produced in the device 10 by means of a single loudspeaker device 22. Loudspeaker 22 is disposed with its mouth in the plane of intersection of two acoustic channels 45A and 45B. The acoustic channels are formed in the housing 12. The loudspeaker 22 propagates sound energy upward and away from the housing 12 through channels 45A and 45B. The loudspeaker 22 is positioned at an equal distance from the mouths of channels 45A and 45B. The movement of the sound responsive element of loudspeaker 22 produces an acoustic "push" or "pull" on the appropriate side of the sound responsive element. The result of such loudspeaker positioning produces phase opposing acoustic energy exiting the mouths of channels 45A and 45B. The sound intensity dispersion patterns of this arrangement are equivalent to the previously described embodiment in that phase opposing portions of the intensity patterns overlap in the vicinity of the microphone axis 29. Thus, sound detected between the loudspeaker channel 45A and uni-directional microphone 47 is essentially equal in magnitude to the acoustic coupling between loudspeaker channel

45B and uni-directional microphone 47. Therefore, sounds emanating from the channels 45A and 45B will be destructively canceled in the region of the microphones maximum sensitivity which is located about the microphone axis 29.

In the foregoing description some of the several novel features of the teleconferencing device according to the present invention have been described. The combined effects of the teleconferencing terminal's acoustic configuration, namely the symmetrical placement of the loudspeakers relative to the microphone and phase opposing operation of the loudspeakers, provides a reduction in overall feedback relative to what would traditionally be expected in a compact speakerphone device.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

What is claimed is:

1. An apparatus for electronic communication, comprising:

a housing;

a uni-directional microphone mounted in said housing with its sound-responsive element facing outwardly thereof, said uni-directional microphone having a central axis that defines a region of maximum sensitivity to sound waves incident on said uni-directional microphone; and at least two loudspeakers mounted in said housing with their mouths facing outwardly thereof, said loudspeakers being electrically connected in phase opposition relative to each other, said loudspeakers having substantially similar sound intensity dispersion patterns and being positioned symmetrically relative to the central axis of said microphone, such that equal and corresponding portions of the loudspeaker sound intensity dispersion patterns of said loudspeakers are positioned symmetrically about said central axis whereby acoustic coupling between said loudspeakers and said microphone is substantially reduced.

2. The apparatus of claim 1, further comprising:

a microphone stalk extending from the housing for positioning said uni-directional microphone.

3. The apparatus of claim 1, wherein the uni-directional microphone is a cardioid microphone.

4. The apparatus of claim 1 wherein, the loudspeakers have matched impedances.

5. The apparatus of claim 1, further comprising:

an echo cancellation circuit operatively connected to the microphone and loudspeakers.

6. An apparatus for electronic communication, comprising:

a housing;

a uni-directional microphone mounted in said housing with its sound-responsive element facing outwardly thereof, said uni-directional microphone having a central axis that defines a region of maximum sensitivity to sound waves incident on said uni-directional microphone; and at least two loudspeakers mounted in said housing with their mouths facing outwardly thereof, said loudspeakers being electrically connected in phase opposition relative to each other, said loudspeakers having substantially similar sound intensity dispersion patterns and being positioned symmetrically relative to the central axis of said microphone, such that a portion of the sound intensity dispersion pattern of one of said loudspeakers overlaps with a portion of the sound intensity dispersion pattern of the other loudspeaker to define a sound cancellation zone which coincides with the region of maximum sensitivity of the microphone, whereby acoustic coupling between said loudspeakers and said microphone is substantially reduced.

7. The apparatus of claim 6, further comprising:

a microphone stalk extending from the housing for positioning said uni-directional microphone within the sound cancellation zone.

8. An apparatus for electronic communication, comprising:

a housing;

a uni-directional microphone mounted in said housing with its sound-responsive element facing outwardly thereof, said uni-directional microphone having a central axis that defines a region of maximum sensitivity to sound waves incident on said uni-directional microphone; and at least two loudspeakers mounted in said housing electrically configured in phase opposition relative to each other with their mouth facing outwardly thereof, each speaker having an axis of maximum intensity directed away from the central axis of the microphone at equal angles with respect to the central axis, said loudspeakers having substantially similar sound intensity dispersion patterns and disposed symmetrically relative to the central axis of said microphone such that portions of their respective sound intensity dispersion patterns overlap in an area defining a region of maximum sensitivity in the vicinity of the central axis of the microphone whereby acoustic coupling between said loudspeakers and said microphone is substantially reduced.

9. The apparatus of claim 8, wherein the angle between the microphone and loudspeaker axes is 35°.

10. The apparatus of claim 8, wherein the overlap zone is confined between the sound responsive element of the microphone and its half-power limit.

11. An apparatus for electronic communication, comprising:

a housing having an outer surface;

two acoustic channels formed in said housing, said acoustic channels intersecting at respective first ends thereof to form a channel intersection;

a uni-directional microphone mounted in said housing with its sound-responsive element facing outwardly thereof, said uni-directional microphone having a central axis that defines a region of maximum sensitivity to sound waves incident on said uni-directional microphone;

first and second ports formed on the outer surface of the housing and spaced equidistant from the central axis of said uni-directional microphone, each of said ports terminating the second end of respective ones of said acoustic channels; and a loudspeaker positioned in said channel such that its mouth coincides with a plane defined by the acoustic channel intersection such that acoustic signals emanating from the mouth of said loudspeaker are in phase opposition to acoustic signals emanating from the rear of said loudspeaker.

12. The apparatus of claim 11, wherein:

said ports each have an axis directed away from the central axis of said uni-directional microphone at equal angles with respect thereto.

* * * * *